(12) United States Patent
Tanaka (10) Patent No.: US 7,731,263 B2
(45) Date of Patent: Jun. 8, 2010

(54) MOTORCYCLE (75) Inventor: Toru Tanaka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 23 days.

(21) Appl. No.: 11/866,980

(22) Filed: Oct. 3, 2007

(65) Prior Publication Data
US 2008/0093147 A1 Apr. 24, 2008

(30) Foreign Application Priority Data

Oct. 18, 2006 (JP) ............................. 2006-284106
Jan. 15, 2007 (JP) ............................. 2007-005537

(51) Int. Cl.
B62J 17/00 (2006.01)
(52) U.S. Cl. .................................... 296/78.1
(58) Field of Classification Search ............... 296/78.1; 362/487, 507
See application file for complete search history.

(56) References Cited

U.S. PATENT DOCUMENTS

| 3,787,088 | A | * | 1/1974 | Dreyer, Sr. | ................. 296/78.1 |
| 6,203,093 | B1 | * | 3/2001 | Suzuki et al. | .............. 296/78.1 |
| 6,951,361 | B2 | * | 10/2005 | Keys | ......................... 296/77.1 |
| 7,007,998 | B2 | | 3/2006 | Toyofuku | |
| 7,367,701 | B2 | * | 5/2008 | Lee | ............................ 362/476 |
| 2002/0007977 | A1 | * | 1/2002 | Ishii et al. | ................... 180/219 |
| 2003/0062740 | A1 | * | 4/2003 | Takemura et al. | .......... 296/78.1 |
| 2004/0188156 | A1 | * | 9/2004 | Karube et al. | .............. 180/68.4 |
| 2004/0264204 | A1 | * | 12/2004 | Toyofuku | ................... 362/473 |
| 2005/0146153 | A1 | * | 7/2005 | Keys | ......................... 296/78.1 |
| 2005/0200153 | A1 | * | 9/2005 | Khan | ......................... 296/78.1 |
| 2008/0192498 | A1 | * | 8/2008 | Suita | .......................... 362/475 |

FOREIGN PATENT DOCUMENTS

| EP | 1172289 A | 1/2002 |
| EP | 1291274 A | 3/2003 |
| EP | 1491434 A | 12/2004 |
| EP | 1495953 A | 1/2005 |
| JP | 11 245868 A | 9/1999 |
| JP | 2005-035526 A | 2/2005 |

OTHER PUBLICATIONS

European Search Report dated Feb. 7, 2008 for EP 07 25 3892.

* cited by examiner

Primary Examiner—Dennis H Pedder
(74) Attorney, Agent, or Firm—Keating & Bennett, LLP (57) ABSTRACT A detachable cover for a motorcycle cowling that can be easily switched with a service part is described. The cover includes a cover front edge section that is formed so as to form a generally continuous surface with at least a portion of an outer periphery edge section of a head light, and a cover rear section that is removably attachable to the cowling and that extends to the rear from the cover front edge section when attached to the cowling. A motorcycle that easily allows external appearance to be changed to satisfy a user's requirements is also described.

15 Claims, 12 Drawing Sheets

MOTORCYCLE

TECHNICAL FIELD

The present invention relates to a motorcycle provided with a body frame, a head light disposed on the body frame, and a cowling that is disposed so as to surround the periphery of the head light.

BACKGROUND ART

Motorcycles are known that, in order to improve external appearance and bearing in mind the need to improve wind shielding effect when running, the front side of a steering handle is covered by a cowling. This type of cowling generally includes a front wall that covers an outer periphery section of a head light, and left and right side walls that extend continuously to the rear from the front wall (for an example, refer to JP-A-2005-35526).

However, in the case of the above-described known cowling for a motorcycle, a design that is thought optimal for each type of motorcycle is used. Thus, it is generally the case that the structure of the cowling cannot be easily switched. Recently, there has been demand in the commercial market for use of structures that allow switching to a cowling that has a design that matches the preferences of the user. However, cowlings are a component that are comparatively large and expensive. Thus, if the cowling is switched as is, considerable expense and a troublesome switching operation are required. As a result, switching of the cowling is not practical, and it has not been possible to satisfy a broad range of users' requirements.

SUMMARY

The invention has been devised in light of the above-described known circumstances, and it is an object thereof to provide a motorcycle that easily allows the external appearance to be changed to satisfy a user's requirements.

To this end, in one aspect of the present invention, a motorcycle is provided including a body frame, a head light disposed on the body frame, and a cowling that is disposed so as to cover a periphery of the headlight. The motorcycle is characterized by including a cover that is attached to the cowling. The cover includes a cover front edge section that is formed to surround at least a portion of an outer periphery edge section of the head light, and a cover rear section that is formed to extend to the rear from the cover front edge section. Further, the cover rear section is removably attached to the cowling.

Thus, in the motorcycle according to the first aspect of the invention, the cover is removably attached to the cowling. As a result, the cover can be switched for a service part that has, for example, a different color, design and/or shape, whereby it is easily possible to create an external appearance that has a great degree of variation, and to satisfy a broad range of users' requirements.

The cover of the invention, as compared to the cowling, has a small size and can easily be attached and removed. Thus, it is possible to inhibit cost increase, and easily create an external appearance that gives a different impression to the viewer.

More specifically, the cover of the invention includes a cover front edge section that surrounds the periphery edge of the head light, and a cover rear section that extends from the cover front edge section to the rear. As a result, a key feature point of the external appearance is formed. Thus, while the cover of the invention is a comparatively small component, it can easily attract the attention of viewers. Accordingly, by switching the cover with a cover that has a different design, it is possible to easily give the motorcycle a different look and the viewer a different impression.

In addition, because the cover rear section is removably attached to the cowling, switching of the cover can be performed easily.

In another aspect of the invention, a detachable cowling cover for a motorcycle including a body frame, a head light disposed on the body frame, and a cowling that is disposed so as to cover a periphery of the head light is provided. The cowling cover is configured for use in connection with the cowling and comprises a cover front edge section that is formed to surround at least a portion of an outer periphery edge section of the head light, and a cover rear section that is formed to extend to the rear from the cover front edge section when attached to the cowling of the motorcycle. The cover rear section is removably attachable to the cowling at a plurality of locations.

DESCRIPTION OF THE PREFERRED EMBODIMENTS

Hereinafter, an embodiment of the invention will be described with reference to the appended drawings.

FIG. 1 to FIG. 12 are figures that illustrate a motorcycle according to one embodiment of the invention. Note that, the terms front and rear, and left and right as used in this embodiment indicate the front and rear and the left and right when viewed from a rider seated on the seat of the motorcyle.

In the figures, 1 is a motorcycle. The motorcycle 1 is provided with a body frame 2, left and right head lights 3, 3 that are disposed to the front of a steering handle of the body frame 2, and a cowling 4 that is disposed so as to cover the periphery of the left and right head lights 3.

The body frame 2 includes a main frame 6 that supports an engine 5 in a suspended manner, and a seat rail 9 that extends to the rear from a rear end upper section of the main frame 6.

A front fork 7 is disposed at a front end section of the main frame 6 via a head pipe 6a, and can be turned to the left and right. A rear swing arm 8 is disposed at a rear end lower section of the main frame 6 via a pivot shaft 8a, and can swing upward and downward.

A front wheel 10 is rotatably supported at a lower end section of the front fork 7, and a steering handle 11 is disposed at an upper end section of the front fork 7. A rear wheel 12 is rotatably supported at a rear end section of the rear swing arm 8.

In addition, a fuel tank 13 is disposed above the main frame 6, and a saddle-type seat 14 is disposed above the seat rail 9 to the rear side of the fuel tank 13.

A front pipe 15 extends in the motorcycle width direction and is disposed to the front of the head pipe 6a of the main frame 6. Both end sections of the front pipe 15 are tightened and fixed by bolts to the main frame 6 via left and right U-shaped brackets 15a, 15a.

Various types of sheet metal stays 19 are attached to the front pipe 15. The sheet metal stays 19 support the left and right head lights 3, 3, the cowling 4, an inner panel 20, left and right side mirrors 16, 16, left and right flasher lights 17, 17, and a meter unit 18.

The meter unit 18 is disposed to the rear of the cowling 4, and upward from a central section between the left and right head lights 3, 3. The left and right flasher lights 17, 17 protrude downwards from a lower surface of the cowling 4. Furthermore, the left and right side mirrors 16, 16 are positioned so as to extend upwards from an upper end section of the cowling 4.

The inner panel 20 is disposed to form a cover above the head light 3 and extends from an outer periphery section of the meter unit 18 to the rear side of the cowling 4. The inner panel 20 is removably attached to the cowling 4 and the stays 19.

Figure 1:
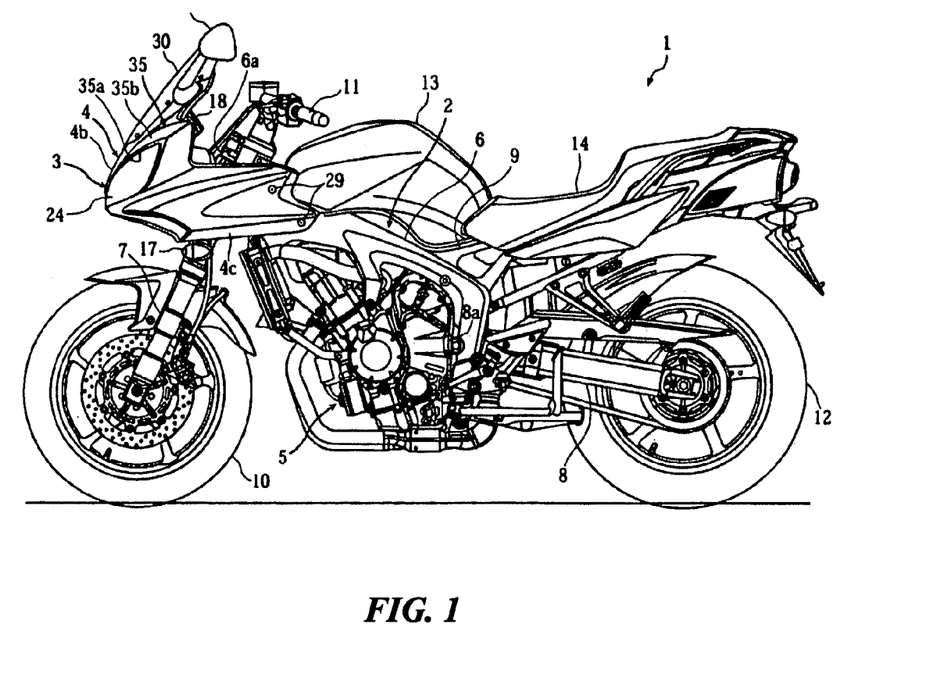
FIG. 1 is a side view of a motorcycle including a cover according to an embodiment of the invention.
Figure 2:
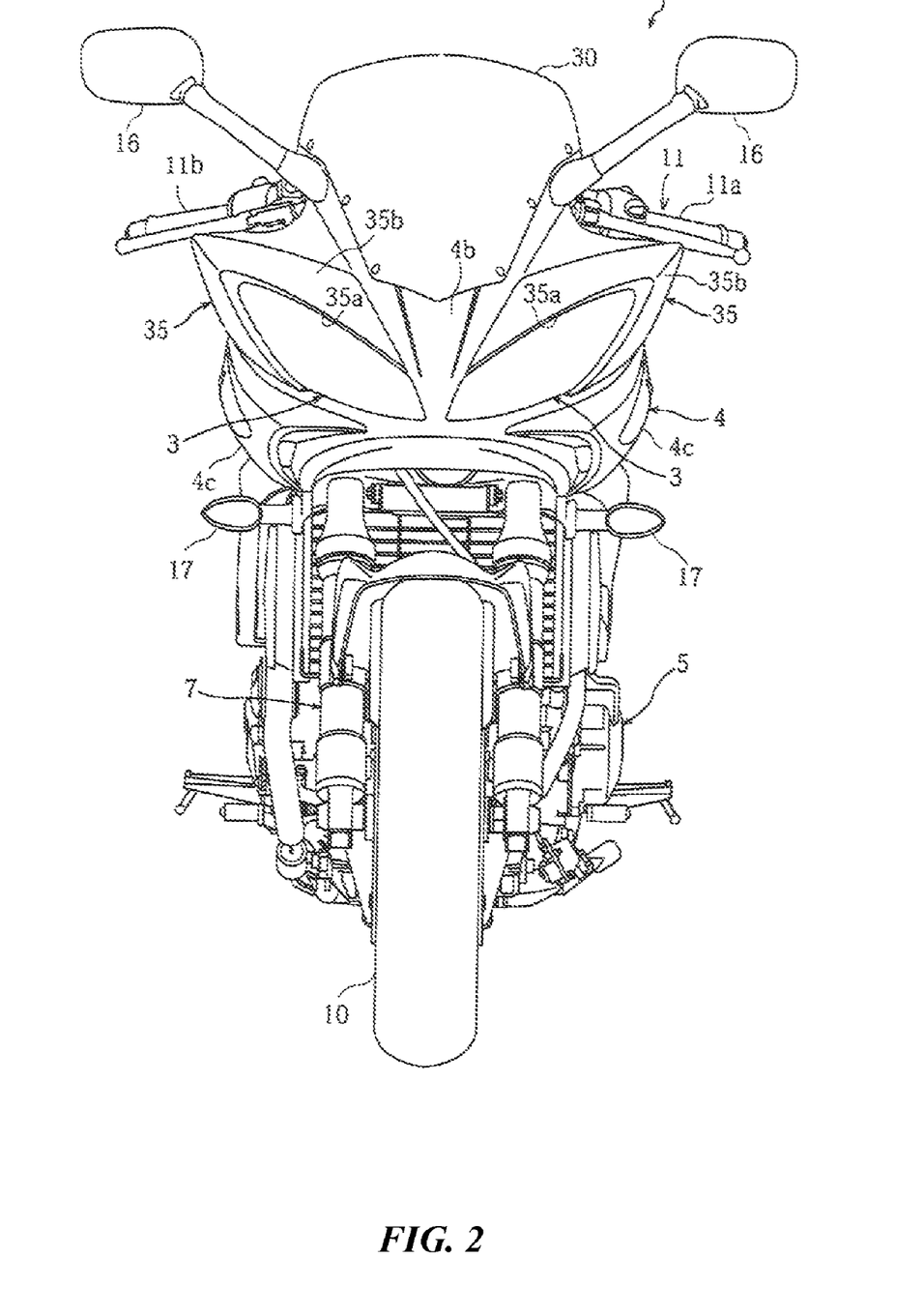
FIG. 2 is a front view of the motorcycle.
Figure 3:
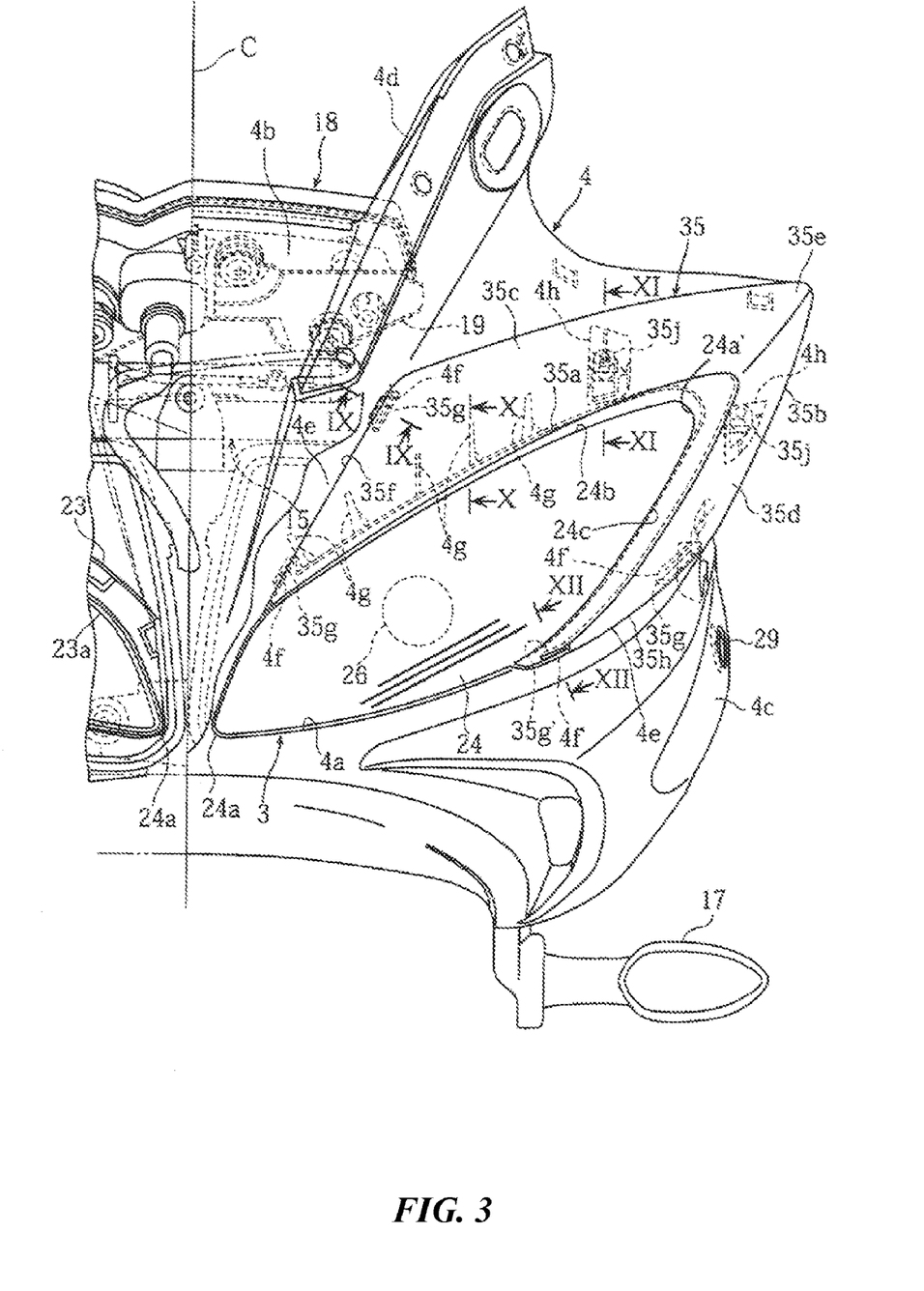
FIG. 3 is a front view of a cover section of the motorcycle.
Figure 4:
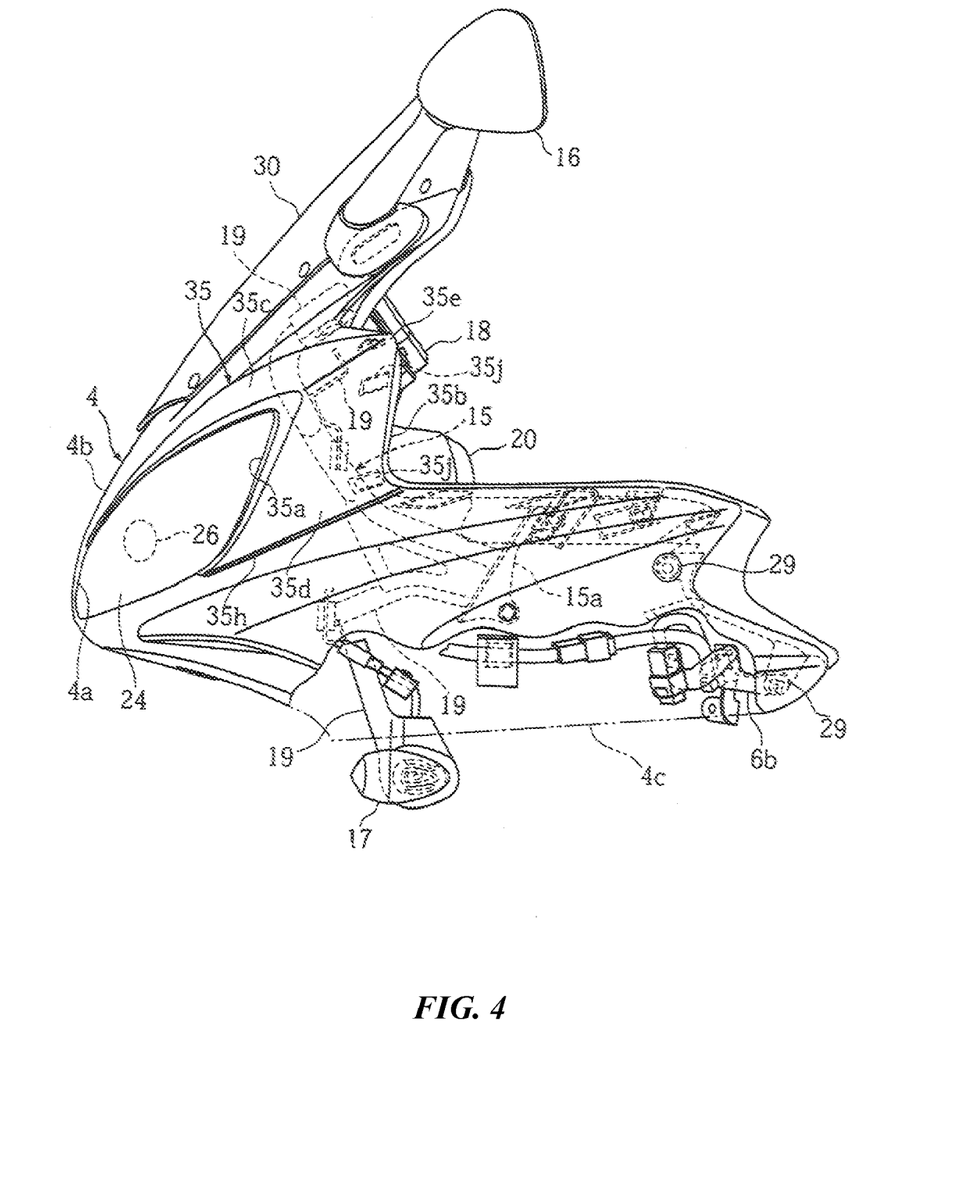
FIG. 4 is a side view of the cover section of the motorcycle.
Figure 5:
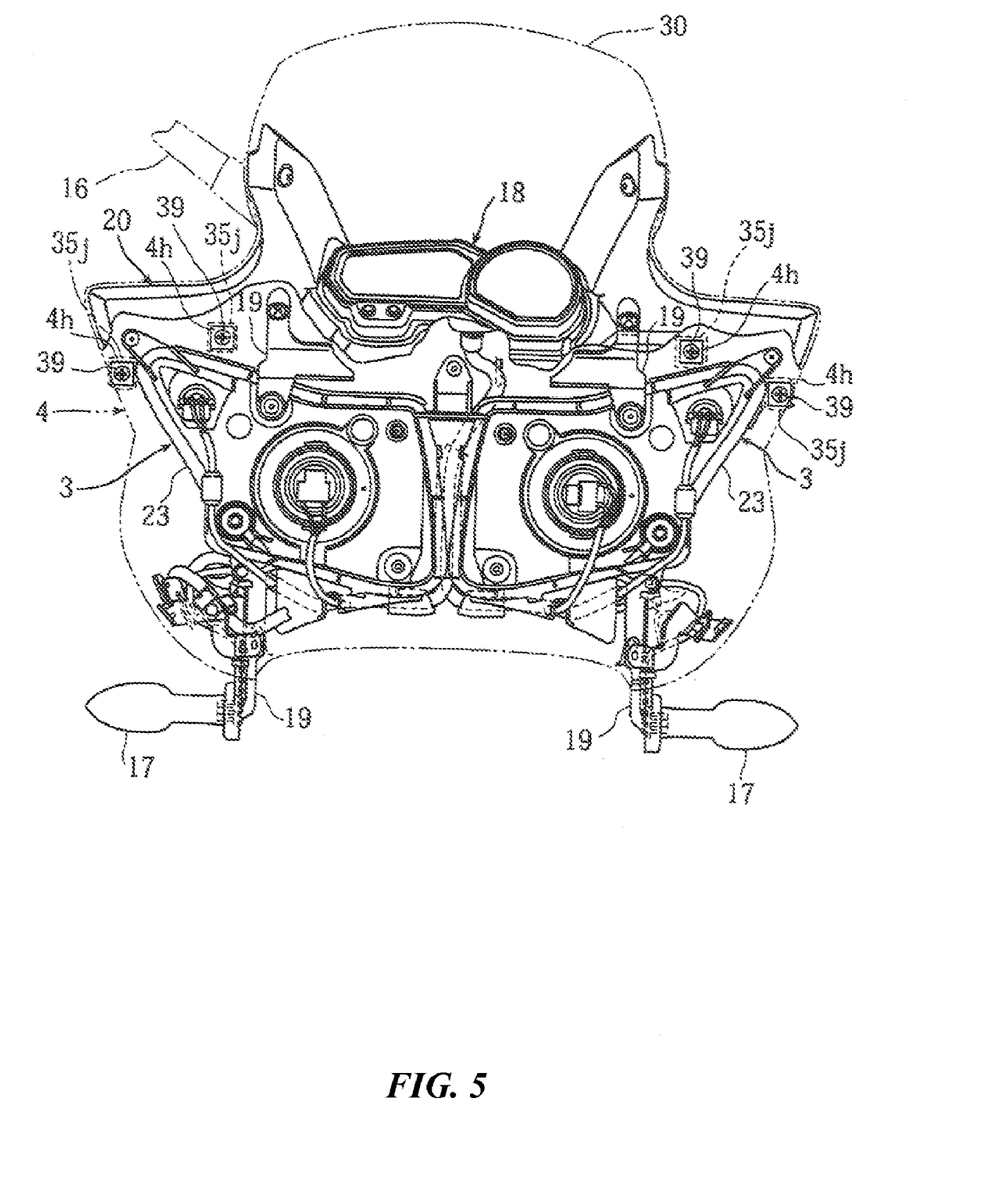
FIG. 5 is a back view of a head light section of the motorcycle.
Figure 6:
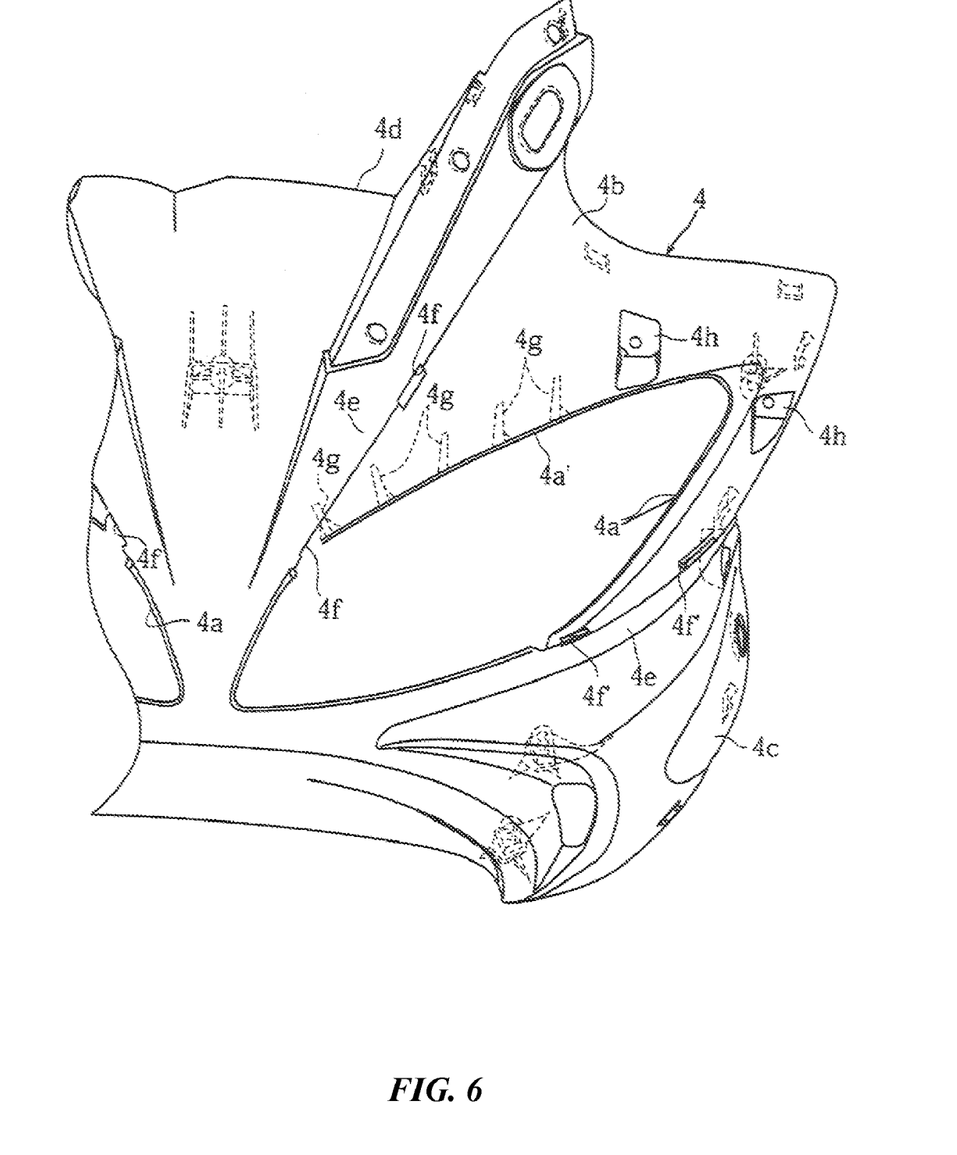
FIG. 6 is a front view of a cowling section of the motorcycle.
Figure 7:
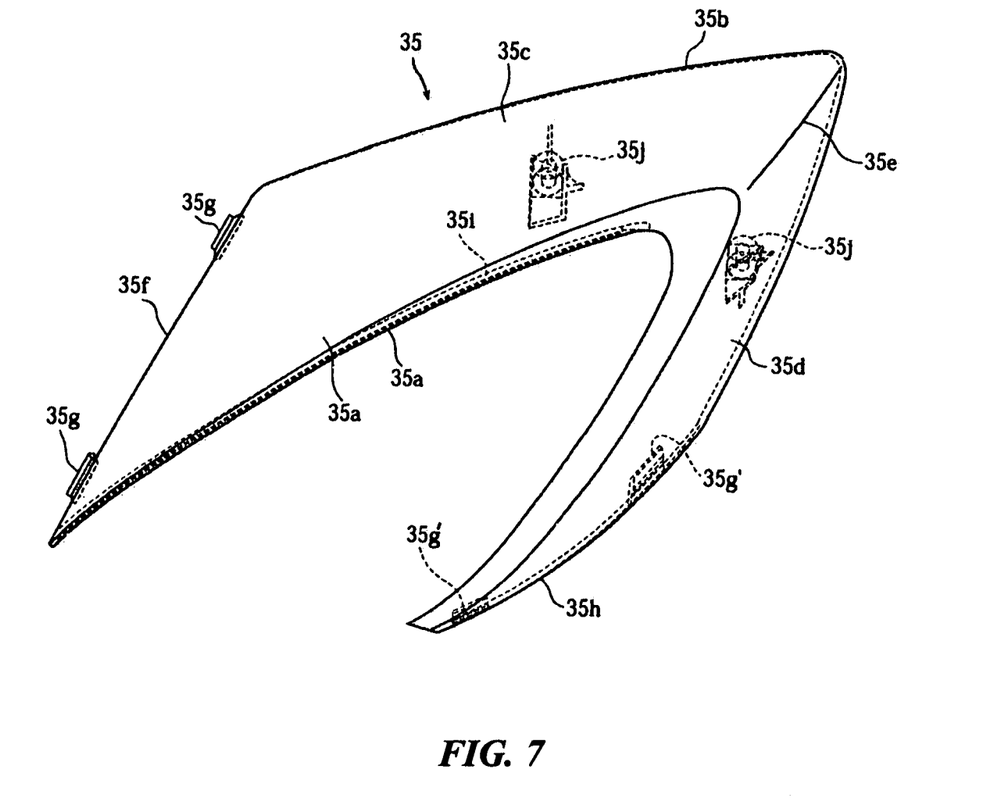
FIG. 7 is a front view of the cover.
Figure 8:
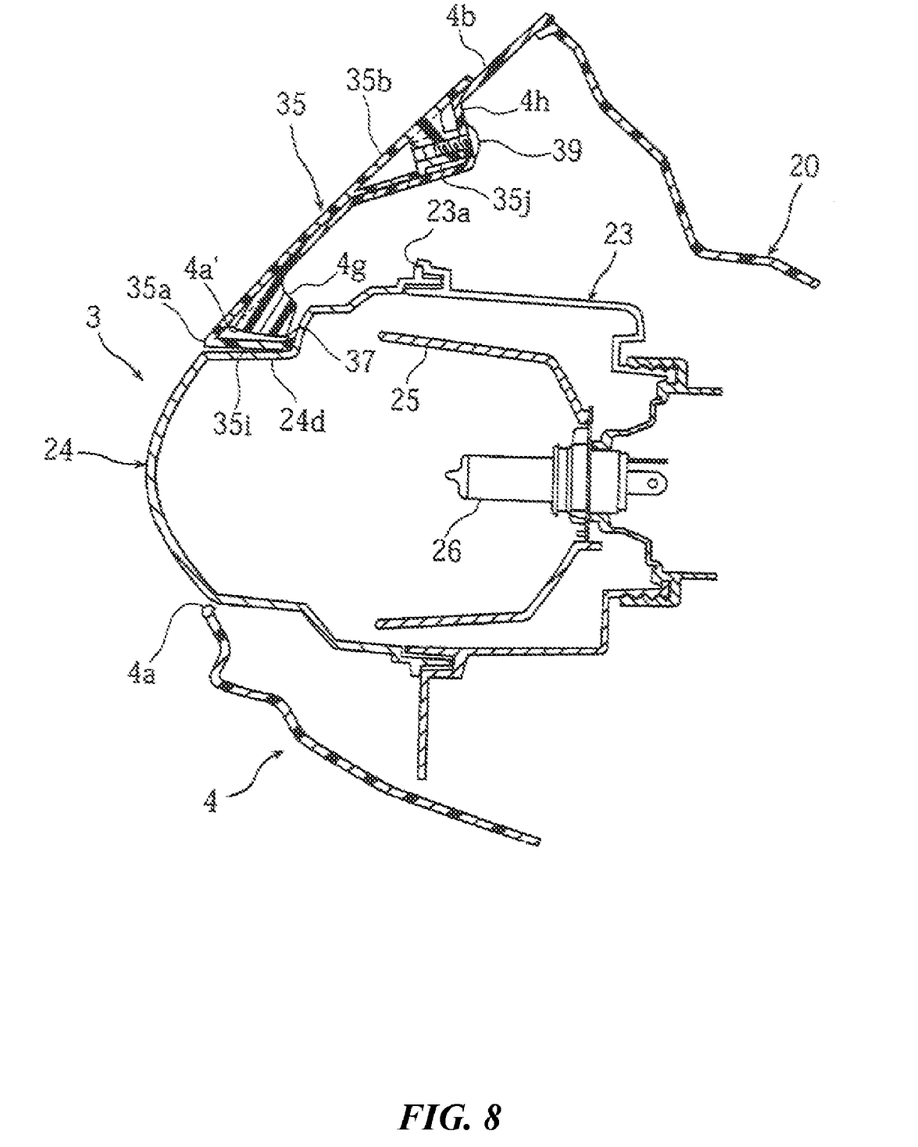
FIG. 8 is a cross sectional side view showing when the cover is attached.
Figure 9:
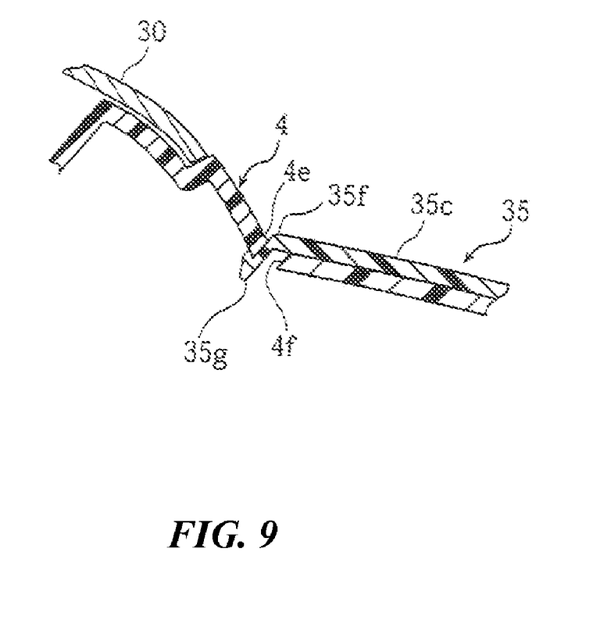
FIG. 9 is a cross sectional view along a line IX-IX of FIG. 3.
Figure 10:
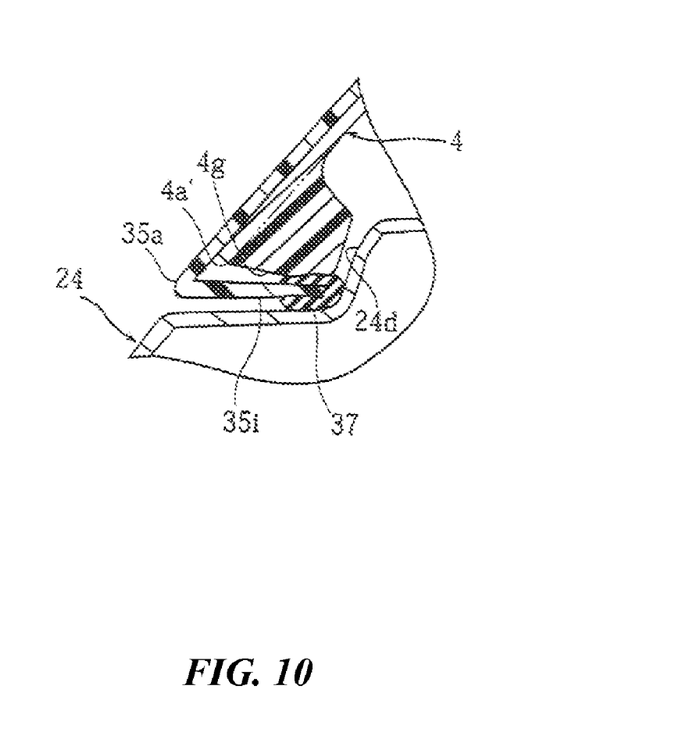
FIG. 10 is a cross sectional view along a line X-X of FIG. 3.
Figure 11:
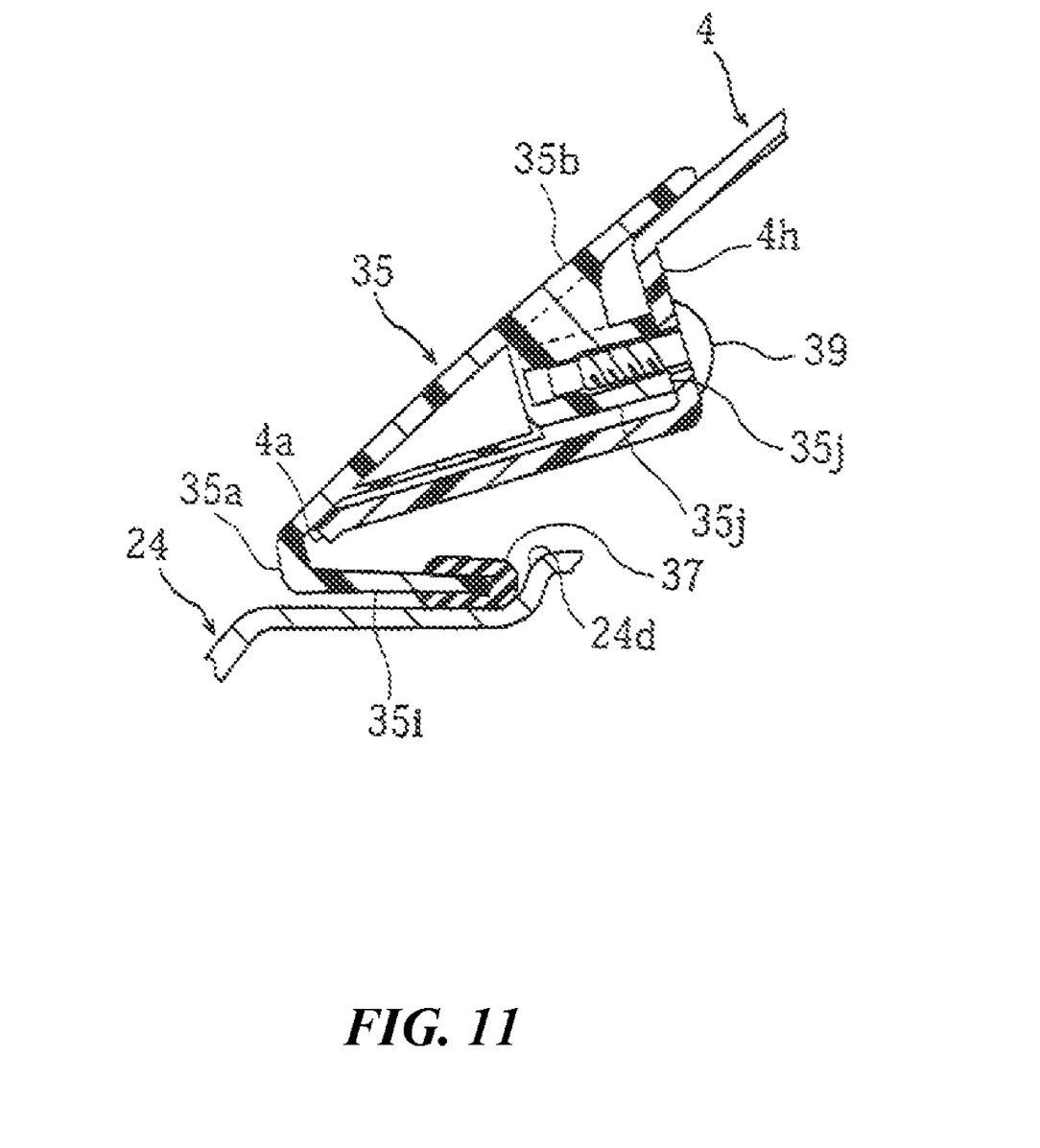
FIG. 11 is a cross sectional view along a line XI-XI of FIG. 3.
Figure 12:
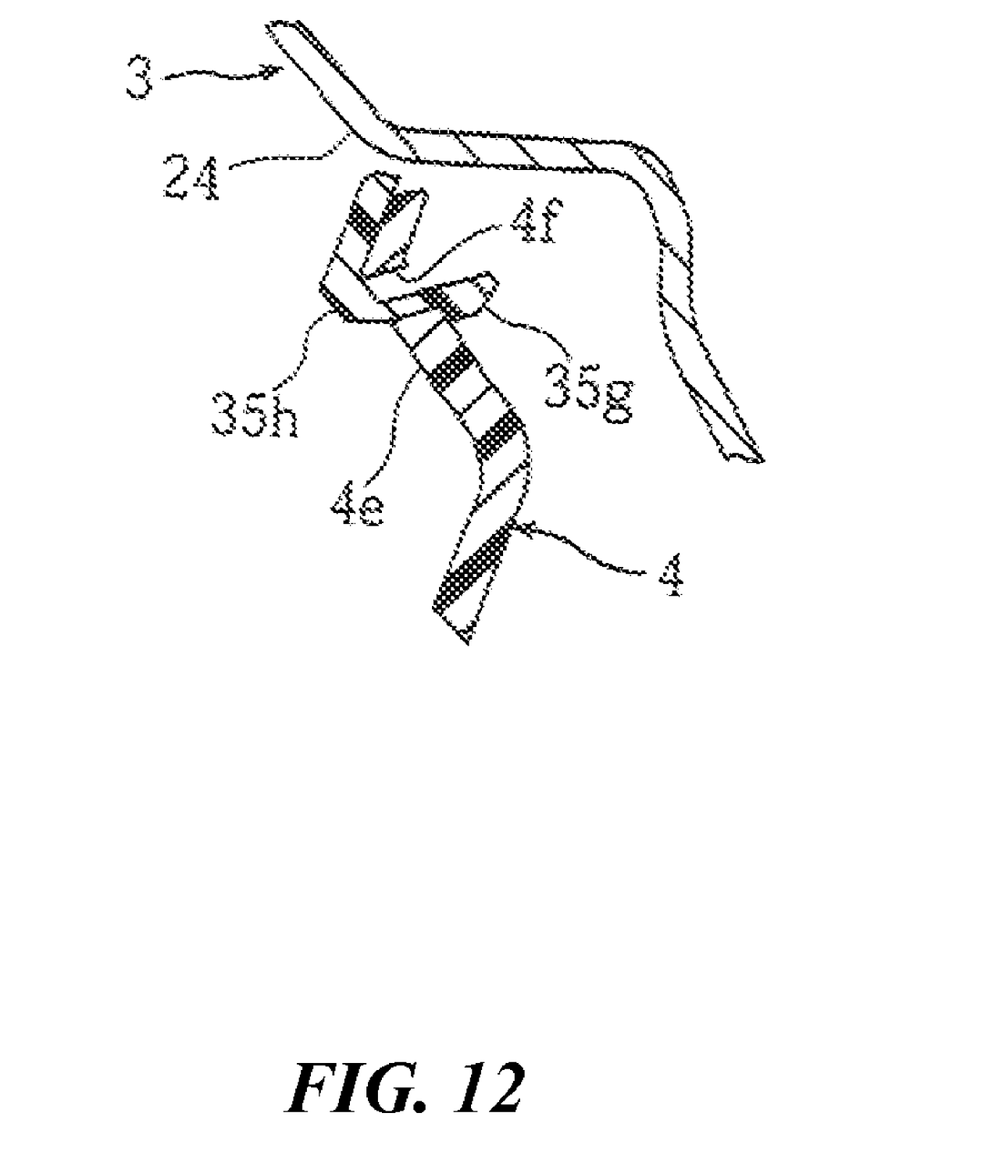
FIG. 12 is a cross sectional view along a line XII-XII of FIG. 3.

The left and right head lights 3 have left-right symmetry, and include, respectively, a housing 23, a lens 24, a reflector 25, and a lamp bulb 26 (refer to FIG. 8). The housing 23 is shaped as a bottomed cylinder when viewed in a cross section. The lens 24 has a bowl like shape when viewed in a cross section and is attached to a female lens connector 23a formed in the housing 23. The reflector 25 also has a bowl like shape and is disposed inside the housing 23. The lamp bulb 26 is removably attached to a bottom section of the reflector 25.

The left and right lenses 24 have a generally elliptical shape when viewed from the front. A motorcycle width direction inner side edge 24a of the left and right lenses 24 is positioned in the vicinity of a motorcycle body center line C, and a motorcycle width direction outer side edge 24a' is positioned diagonally upward to the motorcycle width direction inner side edge 24a and toward the outer side of the motorcycle.

The cowling 4 includes a front wall 4b in which left and right cowling side light openings (opening holes) 4a, 4a are formed, and left and right side walls 4c, 4c that are continuous with and extend rearward from lower edge sections of the light openings 4a. The left and right cowling side light openings 4a surround the outer periphery of the lenses 24.

In the present embodiment, the left and right side walls 4c, when viewed from the side of the motorcycle, pass along the side of the head pipe 6a and extend as far as a position that overlaps with a front edge section of the fuel tank 13. Two bolts 29, 29 fix the left and right side walls 4c along with the inner panel 20 in a removable manner to a bracket 6b that is fixed to the main frame 6.

A recessed notch 4d is formed in an upper section of the front wall 4b, and a wind shield 30 is removably attached to the recessed notch 4d so as to be tightened and fixed thereto.

A pair of left and right covers 35, 35 are removably attached to the cowling 4. Thus, these covers 35, 35 can be switched with service parts having a different design that are available in the commercial market. For the covers 35, it is possible to switch, for example, covers of various types, such as covers that have a different color or the same color as the cowling 4, or covers that have a shape that covers left and right grips 11a, 11b of the steering handle 11 from the front.

The left and right covers 35 have left and right symmetry, and include a cover front edge section 35a, and a cover rear section 35b. The cover front edge section 35a surrounds an outer periphery edge section of the lenses 24 of the head light 3, and forms a generally continuous surface with the edge section. The cover rear section 35b extends integrally to the rear from the cover front edge section 35a and is attached to the cowling 4 in a removable manner. The more specific structure of cover 35 according to the present embodiment will be described next.

The cover front edge section 35a of the cover 35 is formed to surround at least a portion of the outer periphery of a headlight 3. In the present embodiment, the cover front edge section 35a is formed to surround the full length section of an upper edge 24b of the lens 24 of the head light 3 and the full length of the rear edge section 24c of the lens 24. In other embodiments, the cover may extend along different portions of lens 24. The cover rear section 35b, when viewed from the front of the motorcycle, extends to the rear while spreading outwards to the outer side in the motorcycle width direction from the cover front edge section 35a. More specifically, in the present embodiment, the cover rear section 35b has a strip like shape including an upper edge member 35c and a side edge member 35d. The upper edge member 35c extends diagonally upward to the rear from a motorcycle width direction inner side edge section 35f toward the motorcycle width direction outer side. The side edge member 35d extends downward and slightly to the inside in a curved manner from an outer edge of the upper edge member 35c. An inner periphery edge section of the upper edge member 35c and the side edge member 35d forms a molding side light opening (head light surrounding section) 35a' that surrounds an upper edge 24b and a rear edge section 24c of the lens 24 of the head light 3. In addition, a boundary section 35e of the upper edge member 35c and the side edge member 35d protrudes to the rear and to the front.

A front and rear pair of inner side hooks 35g, 35g and lower side hooks 35g', 35g' are formed respectively in the inner side edge section 35f of the upper edge member 35c and a lower side edge section 35h of the side edge member 35d.

In addition, inner side engagement holes 4f, 4f, and lower side engagement holes 4f', 4f' that detachably engage with the hooks 35g, 35g' are formed in mating surfaces 4e, 4e of the cowling 4 that mate with the inner side edge section 35f and the lower side edge section 35h of the cover 35. As a result, the cowling 4, the mating surfaces 4e, 4e, the covers 35, and inner side edge section 35f and the lower side edge section 35h of the covers 35 form a generally continuous surface.

A flange 35i that bends toward the rear is formed in an upper edge section of the molding side light openings 35a' of the covers 35. A rubber trim (elastic member) 37 is fitted to the flange 35i.

In addition, a plurality of vertical ribs 4g are formed at spaced apart distances, preferably equidistance, in the motorcycle width direction in a rear surface of an upper edge section (inner periphery edge section) 4a' of the cowling side lens opening 4a of the cowling 4. Moreover, a stepped section (outer periphery edge section) 24d is formed in an upper edge section of the lens 24 of the head light 3. Lower faces of the vertical ribs 4g face the stepped section 24d with a distance of separation there between.

Moreover, the flange 35*i* is inserted, from the motorcycle front side, between the upper edge section 4*a*' of the cowling 4 and the stepped section 24*d* of the lens 24, and is sandwiched between each vertical rib 4*g* and the stepped section 24*d* with the rubber trim 37 interposed there between.

Respective bosses 35*j*, 35*j* are formed in the upper edge member 35*c*, and the side edge member 35*d* of the cover 35. Each boss 35*j* is positioned such that an attachment surface 35*j*' thereof extends diagonally downward to the rear (refer to FIG. 11).

Furthermore, each boss 35*j* is located at a position away from each hook 35*g* of the upper edge member 35*c* and the side edge member 35*d*, and at a position near to the boundary section 35*e*. In addition, each boss 35*j*, when viewed from the rear side of the motorcycle, is located at a position to the outer side of the periphery edge of the head light 3, namely, is located at a position where, when attachment bolts are screwed in, the head light 3 will not cause a hindrance.

Furthermore, attachment seats 4*h*, 4*h* are formed with a mating step like shape at a section of the front wall 4*b* and the side walls 4*c* of the cowling 4 that corresponds with the bosses 35*j*. In the present embodiment, the attachment seats 4*h* abut against the attachment surface 35*j*' of the bosses 35*j*.

In addition, each boss 35*j* is tightened and fixed in a removable manner to the attachment seats 4*h* of the cowling 4 by tapping screws (fixing members) 39, 39 that are inserted from the motorcycle rear side.

When each cover 35 is attached, in the state that the inner panel 20 is removed, the flange 35*i* is inserted, from the motorcycle front side, between the vertical ribs 4*g* and the stepped section 24*d* so as to be sandwiched there between. At the same time, each hook 35*g*, 35*g*' is engaged with each engagement hole 4*f*, 4*f*'. In this state, the tapping screws 39 are used to fix the bosses 35*j* to the attachment seats 4*h* of the cowling 4 from the motorcycle rear side. Moreover, when the cover 35 is removed, the tapping screws 39 are loosened and removed, each hook 35*g* is disengaged from each engagement hole 4*f*, and the cover 35 is pulled away to the front.

Figure 13:
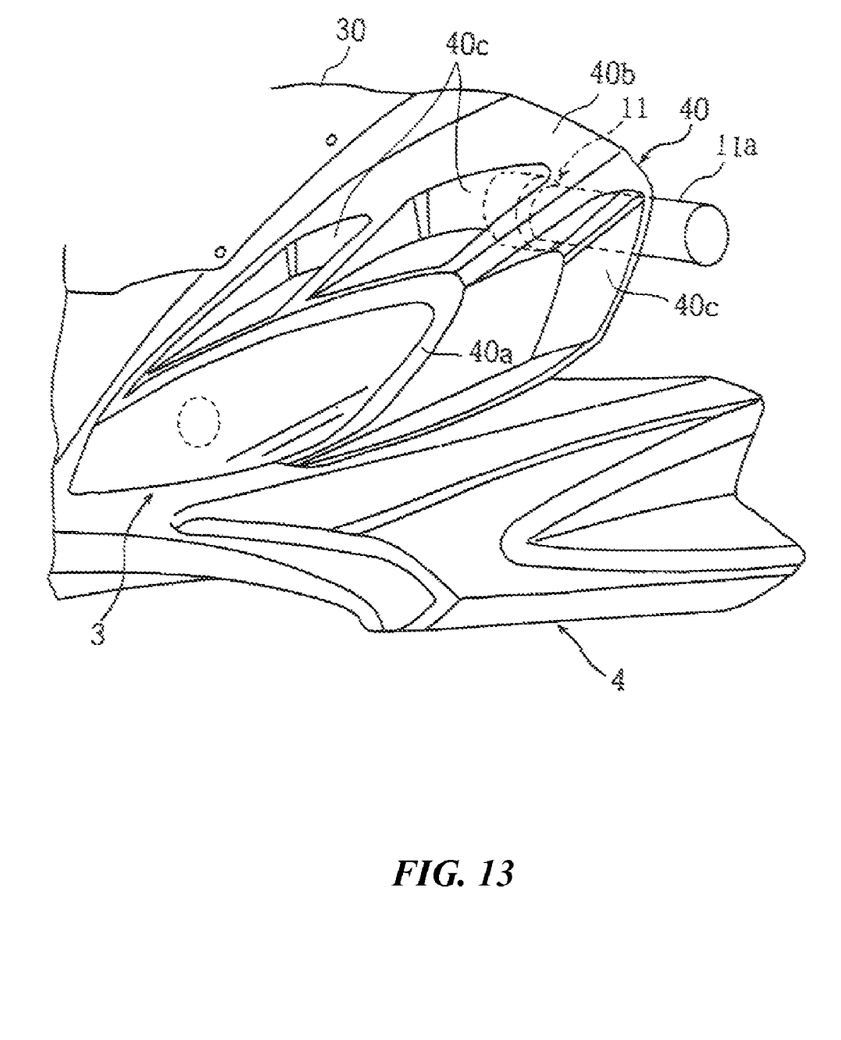
FIG. 13 is a front view of a cover with service part specifications.

Note that, FIG. 13 shows a cover 40 with service part specifications that has a different color and/or shape to the cover 35 described above. The cover 40 has a structure including a cover front edge section 40*a* and a cover rear section 40*b* that extends to the rear from the cover front edge section 40*a*. A plurality of recesses 40*c* that have a square shape are formed in the cover rear section 40*b*. As a result of adopting this structure, a strong and bold design is provided. In this manner, it is possible with the present invention to switch one cover with another cover that satisfies a user's color, design, and/or shape requirements.

In this embodiment, the cover 35 is attached to the cowling 4 in a removable manner. Accordingly, the cover 35 can be switched for another cover, such as the cover 40, available on the commercial market as a service part and that has, for example, a different color, design and/or shape. Moreover, it is easily possible to create an external appearance that has a greater degree of variation, and to satisfy a broader range of users' requirements.

The cover 35 of the above embodiment, as compared to the above-described cowling 4, has a relatively small size and can easily be attached and removed. Thus, it is possible to easily create an external appearance that gives a different impression to the viewer with minimal additional cost.

More specifically, the cover 35 of the above embodiment includes the cover front edge section 35*a* that surrounds the periphery edge of the head light 3, and the cover rear section 35*b* that extends from the cover front edge section 35*a* to the rear. As a result, a key feature point of the external appearance is formed. Thus, while the cover 35 of the embodiment is a comparatively small component it can easily attract the attention of viewers. Accordingly, by switching the cover 35 with the cover 40 that has a different design, it is possible to easily give the viewer a different impression.

Moreover, in this embodiment, the hooks 35*g*, 35*g*' of the inner side edge section 35*f* and the lower side edge section 35*h* of the cover 35 are engaged with the engagement holes 4*f*, 4*f*' of the mating surfaces 4*e* of the cowling 4. Further, the bosses 35*j* of the cover rear section 35*b* are screw fixed to the attachment seats 4*h* of the cowling 4 by the tapping screws 39 that are inserted from the motorcycle rear side. Thus, the cover 35 is removably attached to the cowling 4. The cover 35 can be switched by performing a simple operation, namely, removing the two tapping screws 39 and disengaging the engagement of the hooks. Note that, the tapping screws 39 are covered by the inner panel 20, and are thus not visible from the outside. Accordingly, external appearance is not impaired, and malicious tampering can be inhibited.

In addition, in the above-described embodiment, the flange 35*i* is formed in the cover front edge section 35*a* of the cover 35 and curves toward the rear. The flange 35*i*, when viewed from the front of the motorcycle, is inserted and sandwiched between the vertical ribs 4*g* of the cowling 4 and the stepped section 24*d* of the lenses 24. Thus, sufficient support strength of the cover 35 can be ensured using a simple structure and without additional components. Further, alignment accuracy of the cover 35 and the lenses 24 can be improved.

In addition, the rubber trim 37 is fitted to the flange 35*i*, and the flange 35*i* is sandwiched between the vertical ribs 4*g* and the stepped section 24*d* with the rubber trim 37 interposed there between. Thus, rattling of cover 35 can be inhibited.

According to this embodiment, the cover can be easily switched, and thus, for example, the cover can be easily switched with, a cover like the cover 40 shown in FIG. 13, in which the cover rear section 40*b* extends diagonally upwards to the outer side in the motorcycle width direction from the cover front edge section 40*a* so as to cover the grip sections at the front side of the left and right grips 11*a*, 11*b* of the steering handle 11. If such a switch is performed, it is possible to improve the wind shielding effect when running using the cover 40 on the left and right sides, change the external appearance of the motorcycle, and reduce rider fatigue induced by running wind.

Note that, in the above-described embodiment, an example is explained of a motorcycle having dual headlights. However, the invention may also be applied to a motorcycle that has one head light in a center section in the motorcycle width direction. In this case, a cover may be disposed between the upper edge section of the head light and the lower edge section of a wind shield, or left and right covers may be disposed to extend to the rear from left and right side edge sections of the head light. In the case that this structure is adopted, an external appearance that includes a greater degree of variation can be easily created, and a broad range of users' requirements can be satisfied.

What is claimed:

1. A motorcycle comprising:
    a body frame;
    a left head light and a right head light disposed on the body frame;
    a cowling arranged to cover at least an outer peripheral edge section of the left head light and the right head light; and
    a left cover and a right cover each arranged to be removably and separately attached to and positioned in front of and on top of the cowling; wherein each of the left and right covers includes a cover front edge section arranged to surround at least an upper edge portion and a rear edge portion of the outer peripheral edge section of the left and right head lights and a cover rear section arranged to extend toward a rear of the motorcycle from the cover front edge section, the cover rear section being removably attached to the cowling by an inner side of the cover rear section;

the cover front edge section includes a flange that curves toward the rear of the motorcycle;

the cowling includes left and right opening holes through which the left and right head lights are visible, respectively, and each of the left and right opening holes includes a gap between the outer peripheral edge section of the respective head light and an inner peripheral edge section of the respective opening hole, the inner peripheral edge section of the respective opening hole including at least one vertical rib;

the flange is interposed into the gap so as to be sandwiched between the at least one vertical rib of the inner peripheral edge section of the respective opening hole and the outer peripheral edge section of the respective head light; and the cover front edge section abuts against the at least one vertical rib at the inner peripheral edge section of the respective opening hole via an elastic member.

2. The motorcycle according to claim 1, wherein the cover front edge section is also engaged with the cowling.

3. The motorcycle according to claim 1, wherein the cover rear section of the left and right covers includes an engagement hook on an outer peripheral section, and the engagement hook is engaged with an engagement hole formed in the cowling.

4. The motorcycle according to claim 1, wherein the cover rear section is removably fixed to the cowling by a fixing member that is inserted from the rear of the motorcycle.

5. The motorcycle according to claim 4, wherein the fixing member is a screw member.

6. The motorcycle according to claim 5, wherein the cover rear section has an attachment boss on an outer side of the left and right head lights when the motorcycle is viewed from a front to rear direction, and the attachment boss is removably fixed to the cowling by the screw member, wherein the screw member is inserted from the rear of the motorcycle.

7. The motorcycle according to claim 1, wherein the motorcycle is provided with a steering handle that is disposed to the rear of the left and right head lights and the left and right covers and that includes left and right grips, and the cover rear section of the left and right covers is arranged to cover the left and right grips of the steering handle from the front of the left and right grips, respectively.

8. The motorcycle according to claim 7, wherein the left and right head lights form a generally elliptical shape that inclines diagonally upward and to the outer side in the motorcycle width direction when the motorcycle is viewed from the front, and the cover rear sections of the left and right covers extend diagonally upward from the cover front edge sections and toward the outer side of the motorcycle.

9. A detachable cowling cover for a motorcycle including a body frame, a head light disposed on the body frame, and a cowling that is disposed so as to cover at least an outer peripheral edge section of the head light, the detachable cowling cover comprising:

a cover front edge section arranged to surround at least an upper edge portion and a rear edge portion of the outer peripheral edge section of the head light; and a cover rear section arranged to extend rearwardly from the cover front edge section when attached to the cowling of the motorcycle, the cover rear section being removably attachable to the cowling at a plurality of locations with an inner side of the cover rear section so that the cover front edge section and the cover rear section are positioned in front of and on top of the cowling when the cover rear section is attached to the cowling; wherein the cover front edge section includes a flange, and the flange is arranged to be held by an interference fit between at least one vertical rib of the cowling and the outer peripheral edge section of the head light;

the cover front edge section is arranged to abut against the at least one vertical rib at the inner peripheral edge section of an opening hole of the cowling via an elastic member.

10. The detachable cowling cover according to claim 9, further comprising a plurality of engagement hooks disposed along an edge of the cowling cover and designed to mate with a corresponding mating edge of the cowling, wherein the plurality of engagement hooks are adapted to engage corresponding engagement holes formed in the mating edge of the cowling.

11. The detachable cowling cover according to claim 9, further comprising a plurality of bosses disposed on an inner side of the cowling cover and adapted to be attached to the cowling from a rear side of the motorcycle using a fixing member.

12. The detachable cowling cover according to claim 11, wherein the fixing member is a screw member.

13. The detachable cowling cover according to claim 12, wherein the bosses are formed on the inner side of the cover rear section and the bosses are arranged to be positioned to an outer side of the head light when the motorcycle is viewed from a front to rear direction.

14. The detachable cowling cover according to claim 9, wherein the cowling cover comprises a pair of left and right covers that are mirror images of one another and wherein the cover rear section of the pair of left and right covers is configured to cover left and right grips of a handle bar that is provided on the motorcycle when attached to the cowling and the motorcycle is viewed from the front.

15. The detachable cowling cover according to claim 14, wherein the motorcycle has two head lights positioned to the left and right in a motorcycle width direction, and left and right covers are configured to attach to the cowling adjacent the left and right head lights, respectively.

* * * * *